United States Patent
Pu et al.

(10) Patent No.: US 9,277,519 B1
(45) Date of Patent: Mar. 1, 2016

(54) METHOD FOR PERFORMING MOBILE COMMUNICATIONS AND MOBILE TERMINAL DEVICE

(71) Applicant: Intel IP Corporation, Santa Clara, CA (US)

(72) Inventors: Tian Yan Pu, Dresden (DE); Honglei Miao, Nuremberg (DE); Matthias Weiss, Dresden (DE)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 14/656,811

(22) Filed: Mar. 13, 2015

(51) Int. Cl.
*H04W 56/00* (2009.01)

(52) U.S. Cl.
CPC .......... *H04W 56/005* (2013.01); *H04W 56/001* (2013.01)

(58) Field of Classification Search
USPC .................. 375/259, 267, 344; 370/203, 350
See application file for complete search history.

(56) References Cited

U.S. PATENT DOCUMENTS

| | | | | |
|---|---|---|---|---|
| 6,330,293 B1 * | 12/2001 | Klank | ................. | H04L 27/2657 370/509 |
| 2005/0094550 A1 * | 5/2005 | Huh | ..................... | H04L 5/0007 370/203 |
| 2015/0085853 A1 * | 3/2015 | Smith | ............... | H04W 56/0015 370/350 |
| 2015/0171937 A1 * | 6/2015 | Murakami | ............... | H04B 7/04 375/267 |

OTHER PUBLICATIONS

Yi-Pin Eric Wang, "Cell Search in W-CDMA", IEEE Journal on Selected Areas in Communications, Aug. 2000, pp. 1470-1482, vol. 18, No. 8.

* cited by examiner

*Primary Examiner* — Eva Puente
(74) *Attorney, Agent, or Firm* — Viering, Jentschura & Partner

(57) ABSTRACT

A method for performing mobile communications may include comparing a received digitized signal with a local reference synchronization sequence to generate a plurality of candidate timing estimates. Each of the plurality of candidate timing estimates may represent an estimated temporal location of a synchronization sequence in the received digitized signal. The method may further include demodulating the received digitized signal according to each of the plurality of candidate timing estimates to produce a plurality of reliability metrics, wherein each of the plurality of reliability metrics may be associated with one of the plurality of candidate timing estimates. The method may additionally include selecting one of the plurality of candidate timing estimates as a selected timing estimate based on a comparison between one or more of the plurality of reliability metrics and performing synchronized mobile communications using the selected timing estimate and a frequency offset value associated with the selected timing estimate.

20 Claims, 8 Drawing Sheets

| 0 | 1 | 2 | 3 | 4 | 5 | 6 | 7 | 8 | 9 |

202              204

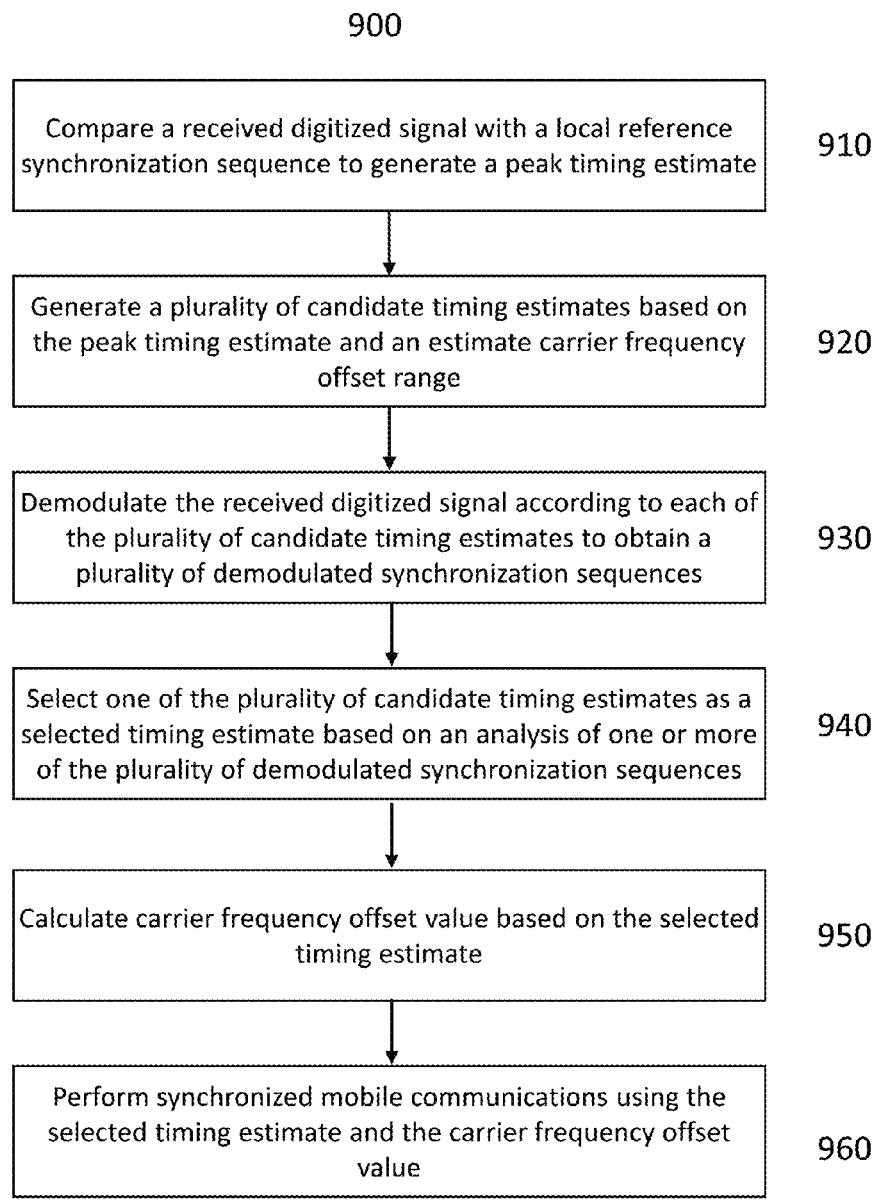

METHOD FOR PERFORMING MOBILE COMMUNICATIONS AND MOBILE TERMINAL DEVICE

TECHNICAL FIELD

Various embodiments relate generally to a method for performing mobile communications and a mobile terminal device.

BACKGROUND

Mobile communication networks require a high degree of synchronization between a User Equipment (UE) and a base station (BS) in order to in order to effectively support wireless transmission and reception. Network configurations that use orthogonal frequency division multiplexing (OFDM) schemes for wireless transmission, such as Long Term Evolution (LTE), are particularly sensitive to synchronization mismatch. Accordingly, it is imperative to establish and maintain proper synchronization of wireless communications between a UE and an Evolved NodeB (eNodeB) in an LTE network.

Current LTE networks utilize OFDM for downlink transmissions, and consequently the reception of wireless signals by a UE must be closely synchronized with the corresponding transmission of the wireless signals by a cell located at a nearby eNodeB. Both timing synchronization and carrier frequency synchronization are vital to effective wireless communication.

Due to the potential the asynchronous transmission timing schedules between cells in LTE networks and signal propagation delays from different cells, a UE attempting to receive downlink signals from an cell must obtain timing synchronization. This may be conventionally performed using synchronization sequences such as Primary Synchronization Signals (PSSs) and Secondary Synchronization Signals (SSSs) that are periodically transmitted by a transmitting cell at an eNodeB. In addition to containing important information detailing the identity of a transmitting cell, these PSSs and SSSs may be used to align the downlink reception schedule of a UE with the corresponding downlink transmission schedule from a particular cell. A UE may subsequently receive downlink transmissions and perform uplink transmissions to and from a cell using the newly synchronized timing schedule. Due to the sensitive nature of OFDM-based systems, small inaccuracies in timing synchronization may result in significant performance degradation. Acquisition of accurate timing synchronization information is thus an essential element to effective network operation.

Carrier frequency synchronization is similarly vital to LTE network performance. Carrier frequency synchronization may be necessary due imperfections in receiver and transmitter oscillators as well as Doppler shifts. These oscillator imperfections may result in a carrier frequency offset, in which the carrier frequency used by a receiver to demodulate a wirelessly modulated signal does not match the carrier frequency used by the transmitter. The resulting carrier frequency offset may be addressed by identifying a carrier frequency offset value and performing appropriate compensations on the receiver side.

Utilizing a high quality local oscillator in a UE for carrier frequency generation may reduce the degree of carrier frequency offset, thereby improving synchronization. However, component ageing as well as the use of poor precision quality parts for cost reduction purposes may result in local oscillator deviations upwards of 20 parts per million (ppm) from a target value. Additionally, new applications of LTE communications in a variety of machine devices from pacemakers to car keys (e.g. for Internet of Things (IoT)) has resulted in the adoption of standards (e.g. by the $3^{rd}$ Generation Partnership Project, or 3GPP) that allow for the use of low-cost oscillators with accuracy of +/−10 ppm. These relatively high local oscillator inaccuracies therefore require a robust timing and frequency synchronization scheme for LTE receiver devices that are capable of tolerating a large frequency offset.

The LTE standard has adopted the use of Zadoff-Chu sequences as the aforementioned PSSs used for UE to cell synchronization. While utilization of these sequences offers a variety of benefits such as reduced interference between cells, the sequences themselves are also uniquely susceptible to carrier frequency offset. High levels of carrier frequency offset may significantly affect performance (due to e.g. damage of the autocorrelation property of Zadoff-Chu sequences), and accordingly it is imperative that carrier frequency offset be appropriately compensated for.

A conventional method of identifying and subsequently addressing carrier frequency offset involves identifying several different carrier frequency offset hypotheses in a presumed range of possible carrier frequency offset values. Cell search and measurement is performed following by Physical Broadcast Channel (PBCH) decoding. Timing and carrier frequency offset values may then be determined based on the results, and subsequently used for synchronization purposes.

However, each hypothesis test can take up to several hundred milliseconds to complete PBCH decoding, and accordingly this process suffers from long latency. This long latency badly deteriorates the user experience for a variety of scenarios, such as e.g. a UE waking up from sleep state. Consequently, a simultaneously low-cost and low-latency approach is desired to obtain proper synchronization information.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 2 shows an exemplary frame structure of a mobile communication network;

FIG. 9 illustrates a method for performing mobile communications according to a further exemplary aspect of the disclosure.

DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

As used herein, a "circuit" may be understood as any kind of a logic implementing entity, which may be special purpose circuitry or a processor executing software stored in a memory, firmware, or any combination thereof. Furthermore, a "circuit" may be a hard-wired logic circuit or a programmable logic circuit such as a programmable processor, for example a microprocessor (for example a Complex Instruction Set Computer (CISC) processor or a Reduced Instruction Set Computer (RISC) processor). A "circuit" may also be a processor executing software, for example any kind of computer program, for example a computer program using a virtual machine code such as for example Java. Any other kind of implementation of the respective functions which will be described in more detail below may also be understood as a "circuit". It may also be understood that any two (or more) of the described circuits may be combined into one circuit.

The efficiency of a synchronization process using Long Term Evolution (LTE) Primary Synchronization Sequences (PSSs) may be substantially improved by exploiting the cross-correlation property that a PSS shares with frequency shifted versions of itself. This relationship between frequency-shifted versions of the same PSS may be utilized to perform a joint time and frequency synchronization with low-latency that allows for the use of low-quality oscillators. Overall synchronization time as well as device cost may accordingly be reduced.

Figure 1:
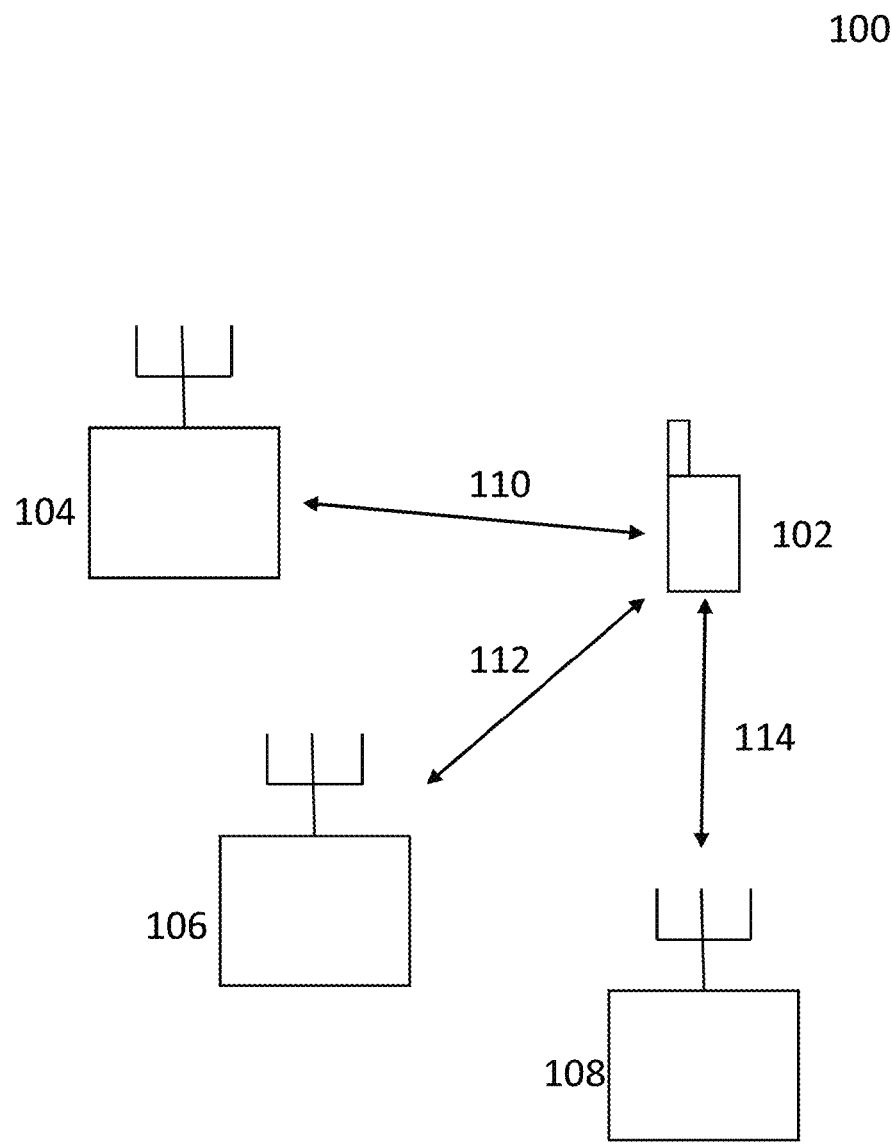
FIG. 1 shows a mobile radio communication system.

FIG. 1 shows mobile radio communication system 100. Mobile radio communication terminal device 102 such as e.g. a User Equipment (UE) 102 may receive a plurality of radio signals from one or more base stations such as e.g. NodeBs or eNodeBs (eNBs) 104, 106, and 108, e.g. via respective air interfaces 110, 112, and 114. It is to be noted that although the further description uses a configuration of mobile radio communication system 100 in accordance with Long Term Evolution (LTE) or in accordance with Long Term Evolution Advanced (LTE-A) for explanation, any other mobile radio communication system 100 may be provided, such as any 3GPP ($3^{rd}$ Generation Partnership Project) mobile radio communication system (e.g. in accordance with Universal Mobile Telecommunications System (UMTS)), 4GPP ($4^{th}$ Generation Partnership Project) mobile radio communication system, and the like.

UE 102 may therefore receive radio signals from one or more of eNBs 104-108. UE 102 may need to establish proper synchronization with one of eNBs 104-108 in order to effectively demodulate and process any radio signals received therefrom. UE 102 may additionally need to establish synchronization in order to properly complete uplink transmissions to one of eNBs 104-108. Accordingly, UE 102 may perform processing on a signal received from one of eNBs 104-108 in order to properly establish synchronization information.

As previously detailed, both timing and frequency synchronization may be necessary in order to properly receive and demodulate received radio signals. Timing synchronization may refer to identifying a temporal (or time-based) reference point in a received radio signal, and performing future reception/transmission of radio signals using the identified temporal reference point. While cells in an LTE network configuration generally follow an individually fixed, periodic scheduling scheme, cells do not synchronize their transmissions with the other cells (i.e. are asynchronous with one another). A UE attempting to initialize downlink communications with a transmitting cell may therefore be initially unaware of the exact timing when the transmitting cell will be transmitting specific information. However, a UE may establish a reference point in a received downlink signal, and schedule future transmissions/receptions from a cell using this reference point combined with existing knowledge of the fixed, periodic scheduling scheme. However, knowledge of the scheduling scheme may not be useful without accompanying identification of a usable reference point. A reference point in a received downlink radio signal from a cell may be determined by identifying the temporal location of a synchronization sequence, such as e.g. a PSS, in the received signal. For example, cells or base stations in LTE networks may periodically transmit PSSs according to a fixed period (i.e., following the fixed scheduling scheme). A receiving UE may thus locate the position of a PSS in time, and consequently may infer the scheduling of future downlink reception using this identified PSS time location as a reference point. Identifying an incorrect or inaccurate PSS location may result in a scheduling mismatch, thereby contributing to a degradation in receiver performance.

Frequency synchronization may refer to identifying an offset between the carrier frequency of a received radio signal and the carrier frequency used by a receiver in UE 102 to demodulate the received radio signal. The transmitter carrier frequency may be generated by a local oscillator at the respective transmitting eNB 104, 106, or 108, while the receiver carrier frequency may be generated by a local oscillator at UE 102. However, imperfections in the local oscillators as well as Doppler effects in the wireless channel may cause the carrier frequency of a radio signal received at UE 102 to be substantially different from the locally generated carrier frequency. An offset between the carrier frequency of the received signal and the locally generated carrier frequency is known as the "carrier frequency offset". Frequency synchronization thus refers to identifying and subsequently compensating for this carrier frequency offset. Failure to appropriately compensate for the carrier frequency offset may result in deficient recovery of signals contained in the received radio signal.

Inaccuracies in both timing and frequency synchronization may severely deteriorate the overall performance of downlink signal reception. It is therefore vital to provide a robust scheme for timing and frequency synchronization in LTE networks that is able to obtain precise estimates for both a timing reference point (such as e.g. the temporal location of a PSS in a received signal) and a carrier frequency offset (such as e.g. a difference in frequency between a transmitter and receiver).

Previous approaches to timing and frequency synchronization include processing a received radio signal to obtain an estimate of the location in time of a synchronization sequence in the received radio signal, and subsequently performing demodulation and decoding of further received signals using the timing estimate and a number of carrier frequency offset estimates. The decoding results may then be utilized to determine a suitable carrier frequency offset based on the utilized estimates.

However, these approaches conventionally perform cell search and measurement followed by full Physical Broadcast Channel (PBCH) decoding using the estimated time reference point and the carrier frequency offset estimates, which may introduce a long latency time into the synchronization process. The testing of each carrier frequency offset estimate may take several hundred milliseconds, causing a significant delay in the reception of further data signals.

An improved process for obtaining joint time and frequency synchronization may significantly reduce the latency involved in establishing proper synchronization while still providing highly precise timing and frequency synchronization information. This joint time and frequency synchronization process may include identifying a peak timing estimate that indicates a temporal location of a synchronization sequence (such as a PSS) in a received signal. Several timing estimates may be derived from this peak timing estimate by leveraging a predetermined property of the synchronization sequence. The predetermined property may reflect a relationship between frequency shifted versions of the synchronization sequence. The timing estimates may represent additional potential temporal locations of the synchronization sequence in the received signal, and may be subsequently evaluated to determine if one of the timing estimates is more accurate than the remaining timing estimates and peak timing estimate.

The timing estimates may be evaluated for accuracy by attempting to perform demodulation of the synchronization sequence contained in the received signal according to each timing estimate. The resulting demodulated synchronization sequences may then be assessed to determine the most accurate timing estimate. A carrier frequency offset estimate may then be calculated after determining a reliable timing estimate. The obtained timing estimate and carrier frequency offset may subsequently utilized to receive and demodulate further radio signals.

Time and frequency synchronization is accordingly dependent on proper detection of synchronization sequences in received radio signals. The LTE network configuration utilizes Zadoff-Chu sequences as PSSs, which are well-equipped for wireless applications due to the unique property of producing zero correlation between cyclically shifted versions of an original Zadoff-Chu sequence. This property is advantageous in reducing the interference caused by multipath delay, in which multiple propagation paths cause reception of multiple versions of an originally transmitted signal arrive at slightly offsetting times.

An exemplary LTE network configuration may utilize three different PSSs $s_k$, k={0, 1, 2}, where each PSS $s_k$ is defined by the unique sector ID k={0, 1, 2}. Each of the three PSSs $s_k$ may be generated using a Zadoff-Chu sequence having a unique seed value, and may be selected to be orthogonal from one another. Accordingly, an eNB containing three transmitting cells may assign each cell a different PSS (i.e. $s_0$, $s_1$, or $s_2$), where the PSS of each cell is orthogonal respective to the PSS of the other cells. Inter-cell interference may consequently be reduced due to the use of orthogonal sequences.

In addition to the unique sector ID k defining the respective PSS, each cell may additionally broadcast a Secondary Synchronization Signal (SSS). Each SSS may be defined by a physical layer cell identity group g, where g={0, 1, . . . , 167}. The corresponding cell identity (which ranges from 0 to 503) unique to each cell may be identified based on determination of the sector ID k and the physical layer cell identity group g. A UE may accordingly determine the transmitting cell based on the analysis of both a PSS and SSS in a received radio signal.

Figure 2:
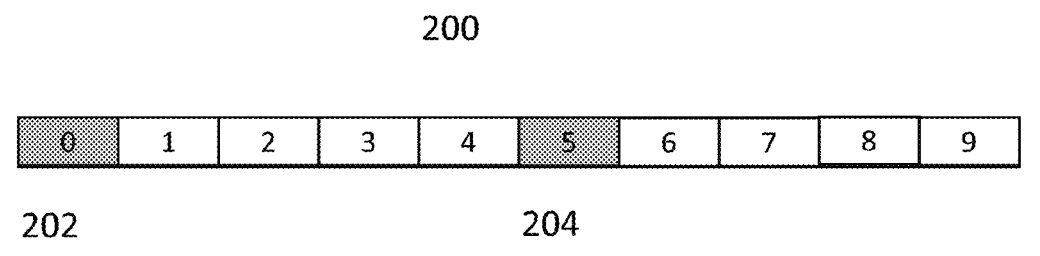

In addition to determining cell identify information, a UE such as UE 102 in FIG. 1 may establish timing synchronization by identifying the location in time of a Zadoff-Chu sequence (in the form of a PSS vector) in a signal received from a specific cell, such as e.g. a transmitting cell on one of eNBs 104-108. As previously detailed, a cell in an LTE network may periodically transmit a PSS according to a fixed period. For example, cells of an LTE network may be configured to transmit the assigned PSS every 5 subframes in a downlink signal, which equates to every 5 ms. Such a timing scheme is shown in FIG. 2. UE 102 may receive downlink radio signal 200, which may contain 10 subframes (i.e., one frame), each with a 1 ms duration. The $0^{th}$ subframe 202 and the $5^{th}$ subframe 204 may contain a PSS (as indicated by shaded blocks in FIG. 2). While UE 102 may not be initially aware of the exact moment in absolute time when either subframe 202 or 204 starts, UE 102 may perform processing to identify the potential location(s) of a PSS vector in the downlink radio signal 200. As downlink transmissions follow a fixed period (according to a predefined framing scheme), UE 102 may then utilize an identified timing location of a PSS to synchronize further transmissions in time.

Figure 3:
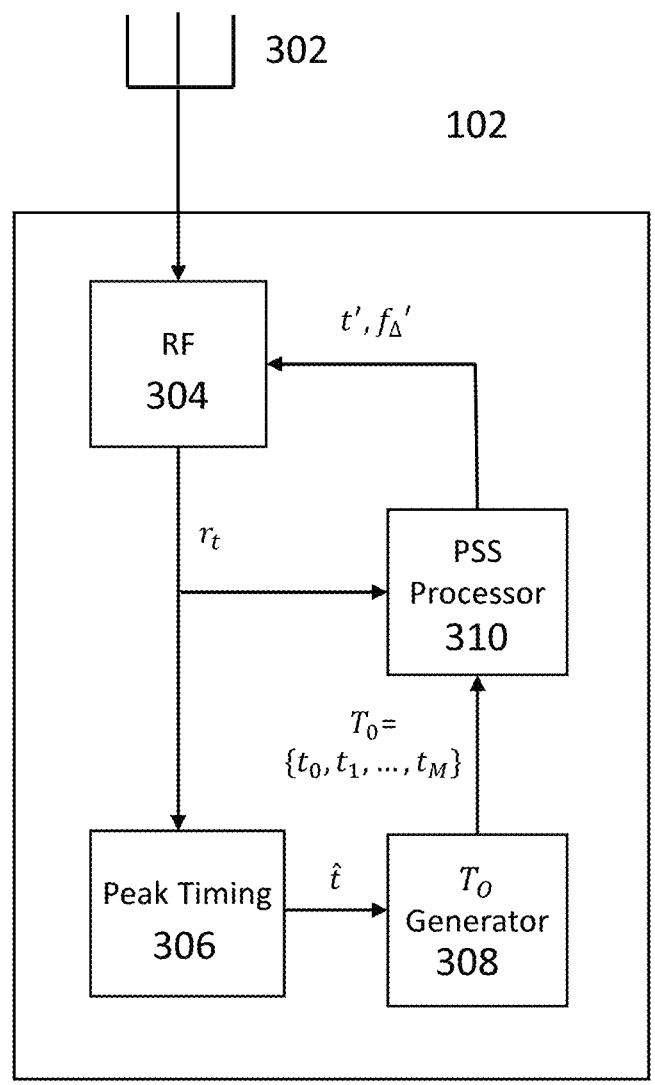
FIG. 3 shows various components and circuits of the UE of FIG. 1.

FIG. 3 shows an exemplary internal architecture of UE 102 according to an aspect of the disclosure. UE 102 may include antenna 302, RF transceiver 304, peak timing estimation circuit 306, timing estimate generation circuit 308, and PSS processing circuit 310. The mentioned circuits may be implemented as separate circuits, e.g. as separate integrated circuits. However, some or all of the circuits (e.g. peak timing estimation circuit 306, timing estimate generation circuit 308, and PSS processing circuit 310) may be implemented by one common programmable processor, such as e.g. a microprocessor. Although not explicitly shown, UE 102 may contain a number of additional processors, circuitry, and/or memory to support a variety of additional operations of wireless radio communications.

UE 102 may receive wireless radio signals using antenna 302. Antenna 302 may be coupled to RF transceiver 304, which may demodulate and digitize the radio signals received from antenna 302. RF transceiver 304 may be configured to receive and accordingly process a variety of received radio frequency signals, such as e.g. Global System for Mobile Communications (GSM) signals, Universal Mobile Telecommunications Systems (UMTS) signals, LTE signals, etc. RF transceiver 304 may be configured to schedule and complete wireless reception and transmission using antenna 302. RF transceiver 304 may therefore need to establish proper synchronization with a serving cell in order to effectively receive and demodulate wireless radio signals received over antenna 304.

As previously detailed, both time and frequency synchronization are essential in supporting adequate reception of received radio signals. Accordingly, RF transceiver 304 may be configured to perform reception and demodulation of received radio signals according to time synchronization parameter t' and frequency synchronization parameter $f_A'$. Time synchronization parameter t' may represent a calculated temporal location of a PSS vector in a received radio signal, and UE 102 may desire for time synchronization parameter t' to be substantially close to actual PSS temporal location t. Similarly, frequency synchronization parameter $f_A'$ may represent a calculated carrier frequency offset between a carrier frequency generated at RF transceiver 304 and the carrier frequency of a received radio signal, and UE 102 may desire for frequency synchronization parameter $f_A'$ to be substantially close to actual carrier frequency offset $f_A$. Values of t' and $f_A'$ that are proximate to actual values t and $f_A$ may indicate a high level of synchronization between UE 102 and a received radio signal, thereby facilitating effective reception and demodulation of radio signals by RF transceiver 304 by properly compensating for time and frequency offsets. Accordingly, an exemplary approach may desire to determine accurate values for t' and $f_A'$ and subsequently perform proper compensation for both t' and $f_A'$, thereby obtaining time and frequency synchronization. RF transceiver 304 may subsequently utilize the calculated values for t' and $f_\Delta'$ to perform synchronized reception of radio signals as shown in FIG. 3.

In order to obtain accurate values for t' and $f_\Delta'$, peak timing estimation circuit 306 may process received signal $r_t$ in order to calculate a PSS peak cross-correlation timing estimate $\hat{t}$. PSS peak cross-correlation timing estimate $\hat{t}$ may be an estimation of the actual temporal location t of a PSS in $r_t$. As shown in FIG. 3, peak timing estimation circuit 306 may receive received radio signal $r_t$ from RF transceiver 304. Peak timing estimation circuit 306 may then generate a locally generated PSS $p^H$ according to the proper sector ID k corresponding to the cell that transmitted $r_t$ (i.e., $p^H = s_k$ where k=0, 1, or 2). Alternatively, a separate component may provide peak timing estimation circuit 306 with $p^H$. Locally generated PSS $p^H$ may therefore be a Zadoff-Chu sequence selected to match with a Zadoff-Chu sequence contained in $r_t$. Peak timing estimation circuit 306 may then calculate the cross correlation over time between $r_t$ and $p^H$ to identify the peak cross-correlation point in time $\hat{t}$, i.e. the PSS peak cross-correlation timing estimate. PSS peak cross-correlation timing estimate $\hat{t}$ may be calculated as follows:

$$\hat{t} =_{arg} \max_t \|p^H r_t\|_F^2. \tag{1}$$

Equation 1 may be explained as follows. Let $s=(d_{LEFT}[0], d_{LEFT}[1], \ldots, d_{LEFT}[T-1], p[0], p[1], \ldots, p[R-1], d_{RIGHT}[0], d_{RIGHT}[1], \ldots, d_{RIGHT}[S-1])^T$ define a transmitted signal vector s of length R+T+S transmitted wirelessly from a transmitter, such as e.g. from one of eNBs 104-108, where $d_{LEFT} = ((d_{LEFT}[0], d_{LEFT}[1], \ldots, d_{LEFT}[T-1])^T$ denotes the data sequence to the left of PSS vector $p=(p[0], p[1], \ldots, p[R-1])^T$, $d_{RIGHT} = (d_{RIGHT}[0], d_{RIGHT}[1], \ldots, d_{RIGHT}[S-1])^T$ denotes the data sequence to the right of PSS vector p in transmitted signal vector s, and $(.)^T$ defines the matrix transpose operation. After considering channel effects (including multipath and noise) and frequency offset, the received signal vector r received at UE 102 may therefore be denoted as:

$$r = hFs + n \tag{2},$$

where h denotes the channel gain of the strongest multipath component, $F(f_\Delta) = \text{diag}(e^{-j\Phi}, e^{-j(2\pi f_\Delta T_s + \Phi)}, e^{-j(4\pi f_\Delta T_s + \Phi)}, e^{-j(2(R+T+S-1)\pi f_\Delta T_s + \Phi)})$, diag(a) defines a matrix with a as the diagonal and zero for the remaining entries, $\phi$ is the initial phase offset caused by the local oscillator at UE 102, and $n \sim CN(0, \sigma^2 I)$ is the interference and noise vector distributed according to a complex Gaussian distribution. The timing estimation for the multipath channel typically aims to obtain the timing of the strongest path, and as such the signal model for the timing estimation includes the contribution of the weaker paths into the total interference and noise term.

The effect of the initial phase offset $\phi$ can be combined with the channel gain h to further define matrix $\bar{F}$ as:

$$\bar{F}(f_\Delta) = \text{diag}(1, e^{-j2\pi f_\Delta T_s}, e^{-j4\pi f_\Delta T_s}, \ldots, e^{-j2\pi(R-1)f_\Delta T_s}) \tag{3}.$$

A received signal element $\bar{r}_m$ of R elements starting from the $i^{th}$ sample of the received signal vector r is further defined as:

$$r_m = (r[i], r[i+1], \ldots, r[i+R-1])^T \tag{4.}$$

The maximum likelihood (ML) based joint timing, frequency offset, and channel coefficient estimation may thus be formulated as:

$$(\hat{t}, \hat{f}_\Delta, \hat{h}) =_{arg} \min_{t, f_\Delta, h} \|\bar{r}_t - h\bar{F}(f_\Delta)p\|_F^2. \tag{5}$$

The channel coefficient estimate $\hat{h}$ can then be obtained by the following close form solution giving the timing and frequency offset estimates:

$$\hat{h} = \frac{p^H \bar{F}^H(f_\Delta)\bar{r}_t}{\|\bar{F}(f_\Delta)p\|_F^2}. \tag{6}$$

Without loss of generality, the following can be plausibly assumed:

$$\|p\|_F^2 = \|\bar{F}(f_\Delta)p\|_F^2 = 1, \tag{7}$$

and $$p(f_\Delta) = \bar{F}(f_\Delta)p \tag{8}.$$

Equation 7 and Equation 8 may be substituted into equation 6 to derive the following ML-based timing and frequency offset estimation:

$$(\hat{t}, \hat{f}_\Delta) =_{arg} \min_{t, f_\Delta} \|\bar{r}_t - p^H(f_\Delta)\bar{r}_t p(f_\Delta)\|_F^2. \tag{9}$$

Equation 9 may be further simplified as:

$$(\hat{t}, \hat{f}_\Delta) =_{arg} \min_{t, f_\Delta} \|p^H(f_\Delta)\hat{r}_t\|_F^2. \tag{10}$$

Equation 10 therefore implies that a two-dimensional search over both time and frequency must be performed to find a parameter pair $(\hat{t}, \hat{f}_\Delta)$ to maximize the amplitude of the correlator output. Such two-dimensional based search estimators conventionally have high computational complexity, and are thus relatively difficult to be realized in practical applications. Accordingly, the proposed exemplary approach may significantly lessen the computational requirements by leveraging known properties of PSS vectors.

In order to reduce the complexity of the time and frequency synchronization process, UE 102 may obtain PSS peak cross-correlation timing estimate $\hat{t}$ according to Equation 1, which does not contain a term for estimated frequency offset $f_\Delta'$ as in Equation 10. PSS peak cross-correlation timing estimate $\hat{t}$ may therefore be an initial estimate as to the temporal location of a PSS in received signal $r_t$. However, inaccuracies may be introduced into the determination of $\hat{t}$ due to the effect that a carrier frequency offset $f_\Delta$ has on the calculated cross-correlation between two PSS vectors. Specifically, the peak cross-correlation in time between two PSS vectors will be shifted from a "true" value (i.e., t) in time (i.e. to t) given a frequency offset $f_\Delta$ between the two PSS vectors. Accordingly, the estimate of the PSS temporal location in $r_t$ (i.e. $\hat{t}$) will be offset in time from the actual PSS temporal location t in the presence of a carrier frequency offset $f_\Delta$ that is reflected in Equation 1 utilizing $r_t$ and $p^H$. This carrier frequency offset $f_\Delta'$ may be induced in the preliminary reception and transposition of a received radio signal to baseband frequencies by UE 102, thereby resulting in $r_t$. For example, RF transceiver 304 may tune to a given carrier frequency by utilizing an internal local oscillator producing carrier frequency $f_c'$ in order to receive a radio frequency signal containing $r_t$, where the radio frequency signal containing $r_t$ has actual carrier frequency $f_c$. Perfect matching carrier frequencies (i.e., where $f_c'=f_c$) may yield error-free reception of $r_t$ (not accounting for other unrelated errors in wireless reception). However, the locally generated carrier frequency $f_c'$ may not be equal to the actual carrier frequency $f_c$, and according a frequency offset $f_\Delta$ may be present in received signal $r_t$ where $f_\Delta=|f_c'-f_c'|$. As previously detailed, these local oscillator imperfections as well as Doppler shifts in the wireless channel may result in such a carrier frequency offset $f_\Delta$. Consequently, there exists a strong likelihood in real-world applications that such a frequency offset will exist, thereby resulting in an inaccurate value for PSS peak cross-correlation timing estimate $\hat{t}$.

In order to compensate for inaccuracies in PSS peak cross-correlation timing estimate $\hat{t}$, UE 102 may utilize prior knowledge of the existing relationship between frequency offset of PSS vectors and resulting peak cross-correlation estimates. For example, the peak cross-correlation timing estimate $\hat{t}$ as obtained by Equation 1 depends directly on the carrier frequency offset $f_\Delta$ between $r_t$ and $p^H$ according to a specific relationship. For large frequency offsets (e.g., over 15 kHz), the peak cross-correlation timing estimate for a given PSS vector (when formed by a Zadoff-Chu sequence) can be uniquely predicted given the frequency offset. In other words, given the sector ID k for a PSS vector $s_k$ (where k={0, 1, 2}) and a frequency offset amount $f_\Delta$, the PSS cross-correlation peak offset (in samples, e.g. 1.92 MSamples/s) can be determined.

Figure 4:
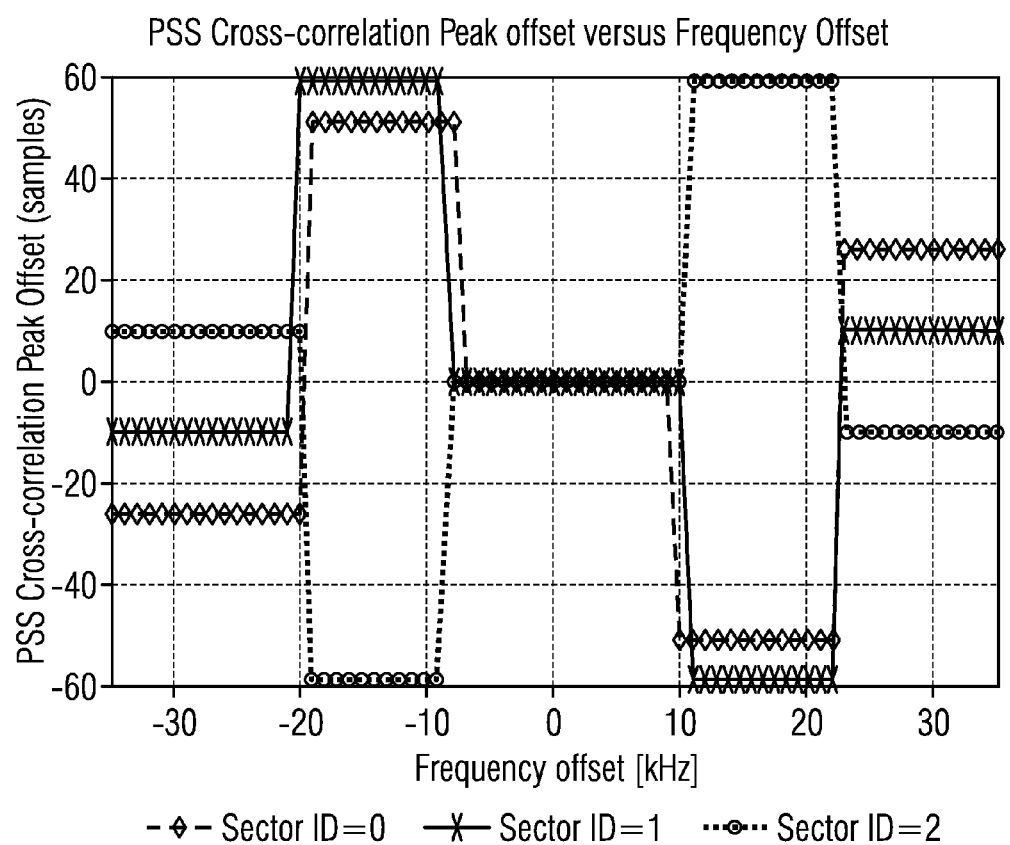
FIG. 4 shows a graphical representation of the effects of carrier frequency offset on synchronization signals.

This relationship is detailed in FIG. 4, which illustrates the unique cross-correlation relationship each PSS vector $s_k$ shares with frequency shifted version of itself. As shown in FIG. 4, frequency offsets greater than 15 kHz magnitude may shift the PSS cross-correlation peak between a PSS vector $s_k$ and a frequency-offset PSS vector $s_k'$ (e.g. $s_k'=s_k e^{-j2\pi f_\Delta}$) in time by a given number of samples. Each PSS vector $s_k$ defined by sector ID k={0, 1, 2} is associated with a frequency offset to PSS cross-correlation peak offset curve, and consequently information regarding the PSS cross-correlation peak offset may be inferred given knowledge of the PSS vector sector ID k as well as the frequency offset $f_\Delta$, and vice versa.

This relationship may therefore induce errors in the calculation of PSS peak cross-correlation timing estimate $\hat{t}$ as calculated in Equation 1. Such a scenario is shown in FIG. 5, which is an exemplary illustration of how the calculation of a PSS peak cross-correlating timing estimate $\hat{t}$ by peak timing estimation circuit 306 may erroneously differ from the actual PSS temporal location $\hat{t}$ by a timing offset $t_z$.

For example, Equation 1 may yield the determination of PSS peak cross-correlation timing estimate $\hat{t}$ as indicated on time axis 500. This may be calculated by calculating the cross-correlation in time between locally generated PSS vector 520 to received radio signal 510, which in an exemplary aspect may be analogous to received radio signal $r_t$ and locally generated PSS vector $p^H$. Received radio signal 510 may contain PSS vectors that are spaced periodically in time, as denoted by the shaded subframes of received radio signal 520. Peak timing estimation circuit 306 may therefore attempt to locate the temporal location of a PSS vector in received radio signal 510 by finding the peak cross-correlation in time between received radio signal 510 and locally generated PSS vector 520.

Figure 5:
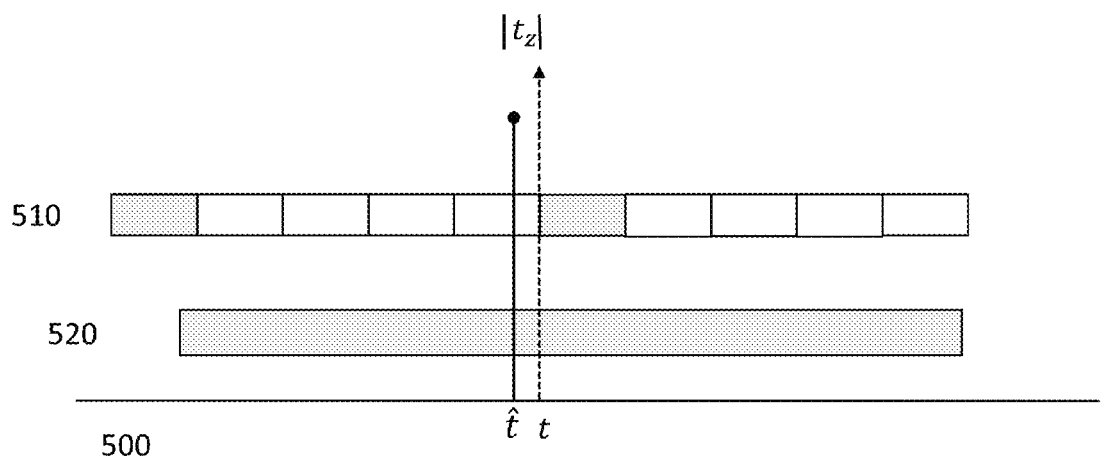
FIG. 5 illustrates the identification of a peak timing estimate based on a received communication frame.

Locally generated PSS vector 520 may be generated based on a predetermined sector ID k, which may be determined prior to the process illustrated in FIG. 5 by peak timing estimation circuit 306 or an additional component that may compare each of the k={0, 1, 2} PSS vectors with $r_t$. As previously detailed, RF transceiver 304 may obtain $r_t$ by tuning to a selected carrier frequency $f_c'$ to extract $r_t$ therefrom. However, the selected carrier frequency $f_c'$ may not be equal to the actual carrier frequency that $r_t$ is modulated on, and accordingly a carrier frequency offset $f_\Delta=|f_c'-f_c|$ may introduce error in the determination of PSS peak cross-correlation timing estimate $\hat{t}$ according to the relationship detailed regarding FIG. 4. As shown in FIG. 5, the calculated value of $\hat{t}$ may be offset from the true PSS temporal location t in received radio signal 520 by a time shift $t_z$. Timing synchronization using the estimated value $\hat{t}$ may be inadequate, and as a result a more accurate value for may be required for proper timing synchronization.

UE 102 may therefore be configured to determine a more accurate value than $\hat{t}$ to utilize as time synchronization parameter t'. To obtain a more precise value for t', timing estimation circuit 306 may send PSS peak cross-correlation timing estimate $\hat{t}$ to timing estimate generation circuit 308. Timing estimate generation circuit 308 may then determine a set of M timing estimates $T_0=\{t_0, t_1, \ldots, t_{M-1}\}$. These timing estimates $T_0$ may accordingly be evaluated by PSS processing circuit 310 to determine the most accurate timing estimate to be used for time synchronization parameter t'. This approach may take into account the effect a carrier frequency offset $f_\Delta$ induced into the calculation of the PSS peak cross-correlation timing estimate $\hat{t}$ according to Equation 1.

Timing estimate generation circuit 308 may generate each of the M timing estimates $T_0$ based on the supplied PSS peak cross-correlation timing estimate $\hat{t}$, the sector ID k of the PSS vector in received radio signal $r_t$ (which may be previously determined by RF transceiver 304), and a target carrier frequency offset capture range F. The derivation of the timing estimates $T_0$ may additionally be based on the relationship as illustrated in FIG. 4.

An exemplary target carrier frequency offset capture range F may be e.g. ±35 kHz. The target carrier frequency offset capture range may be based e.g. on the level of inaccuracy of a local oscillator, which may directly affect the size of the carrier frequency offset. Timing estimate generation circuit 308 may determine the number of suitable timing estimates M based on the target carrier frequency offset capture range F. Timing estimate generation circuit 308 may additionally determine the precise timing value $t_m$, i.e. a candidate temporal location of a PSS vector in received radio signal $r_t$, for each of the M timing estimates $T_0$ based on the target carrier frequency offset capture range F and the accompanying PSS cross-correlation peak offset versus frequency offset curve.

Figure 6:
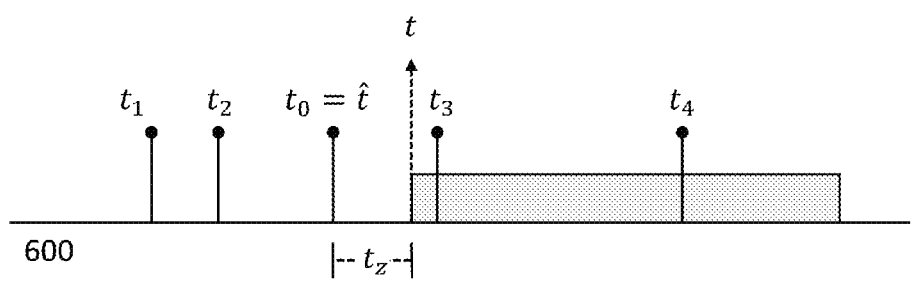
FIG. 6 illustrates the selection of a plurality of timing estimates based on an identified peak timing estimate.

FIG. 6 shows an exemplary representation of timing estimates $T_0=\{t_0, t_1, \ldots, t_{M-1}\}$ with M=5 as plotted on time axis 600. Note that time axis 600 is not to scale. As shown in FIG. 6, each of the timing estimates $t_m$ may be located at a different temporal position on time axis 600. Timing estimate $t_0$ may be set equal to PSS peak cross-correlation timing estimate $\hat{t}$ as calculated by peak timing estimation circuit 306, although this determination may be dependent on the corresponding configuration and behavior of timing estimate generation circuit 308. The remaining timing estimates $\{t_1, t_2, t_3, t_4\}$ may be distributed around PSS peak cross-correlation timing estimate $\hat{t}$ on time axis 599. The exact temporal location of each of timing estimates $T_0$ may be uniquely determined by timing estimate generation circuit 310, and may be selected to correspond with a subset carrier frequency range contained in target carrier frequency offset capture range F. Although timing estimates $T_0$ are illustrated as being non-uniformly spaced, timing estimate generation circuit 308 may alternatively determine M timing estimates with uniform spacing.

Timing estimate $t_1$ may be selected to cover a given subset carrier frequency range from [−10, −20] kHz, while timing estimate $t_3$ may be selected to cover the carrier frequency offset range from [−20,−35] kHz. The target carrier frequency offset capture range F may accordingly be substantially captured through proper selection of timing estimates $T_0$ by timing estimate generation circuit 308.

After determination of M timing estimates $T_0$, timing estimate generation circuit 308 may send timing estimates $T_0$ to PSS processing circuit 310. PSS processing circuit 310 may evaluate each timing estimate $t_m$ included in $T_0$ for suitability as a time synchronization parameter t'. As shown in FIG. 6, PSS peak cross-correlation timing estimate $\hat{t}$ may be selected as one of timing estimates $T_0$, e.g. $t_0=\hat{t}$. PSS peak cross-correlation timing estimate $\hat{t}$ may be offset from actual PSS temporal location t by frequency offset value $t_z$, i.e. $\hat{t}=t_0=|t-t_z|$. This offset may be directly caused by a carrier frequency offset in the determination of PSS peak cross-correlation timing estimate $\hat{t}$. However, in the exemplary scenario illustrated in FIG. 6, timing estimate $t_3$ may fall substantially close to actual PSS temporal location t. PSS processing circuit 310 may consequently be able to identify $t_3$ as the most suitable timing estimate for use as time synchronization parameter t' by analyzing the accuracy of PSS vector deomulation according to each timing estimate $T_0$.

PSS processing circuit 310 may perform PSS vector demodulation according to each of the timing hypotheses $t_m$, m={0, 1, 2, M−1}. PSS processing circuit 310 may therefore attempt to demodulate a PSS vector in received radio signal $r_t$ using each of timing hypotheses $T_0$. This demodulation may be in the time domain by complex conjugated multiplication as follows:

$$d_m = \bar{r}_{t_m} \circ p^*, \quad (11)$$

where $d_m$ is the $m^{th}$ demodulated candidate PSS vector according to timing estimate $t_m$, $\bar{r}_{t_m}$ is received radio signal $r_t$ windowed according to timing estimate $t_m$, and the operator $\circ$ defines the element-wise multiplication between two vectors. After demodulation, PSS processing circuit 310 may rotate the demodulated candidate sequence $d_m$ according to the corresponding wireless channel response h with noise and interference terms inside. Given a correct timing estimate, i.e. where $t_m=t$, the correct demodulated PSS vector $d_u$ is given by:

$$d_u = h(1, e^{-j2\pi f\Delta T_s}, e^{-j4\pi f\Delta T_s}, \ldots, e^{-j2(L-1)\pi f\Delta T_s})^T + n \circ p^*, \quad (11)$$

where L corresponds to the length in number of samples of demodulated PSS vector $d_u$.

PSS processing circuit 310 may then analyze each of the M resulting demodulated candidate PSS vectors $d_m$ to determine the accuracy of the corresponding timing estimate $t_m$ used to demodulate the PSS vector according to Equation 10. PSS processing circuit 310 may utilize the aforementioned perfect autocorrelation property of Zadoff-Chu sequences to quantitatively evaluate the correctness of each resulting demodulated candidate PSS vector $d_m$, thereby also obtaining an reliability metric for each associated timing estimate $t_m$.

As previously detailed, Zadoff-Chu sequences exhibit a special autocorrelation property. Accordingly, PSS processing circuit 310 may calculate the autocorrelation of each of the demodulated candidate PSS vectors $d_m$ in order to evaluate the correctness of each demodulated candidate PSS vector $d_m$.

PSS processing circuit 310 may select an autocorrelation parameter D in order to calculate the autocorrelation value $a_m$ associated with each demodulated candidate PSS vector $d_m$. PSS processing circuit 310 select autocorrelation parameter D based on the desired frequency offset capture range.

PSS processing circuit 310 may calculate the autocorrelation value $a_m$ for each demodulated candidate PSS vector $d_m$ as follows:

$$a_m = \sum_{v=0}^{L-D} d_m[v] d_m^*[v+D]. \quad (12)$$

PSS processing circuit 310 may therefore calculate M autocorrelation values $a_m$, m={0, 1, ..., M−1}, where each autocorrelation value $a_m$ is associated with the corresponding timing estimate $t_m$ used to obtain the demodulated candidate PSS vector $d_m$. Given a correct timing estimate, i.e. timing estimate $t_m=t$, Equation 12 may be re-written as follows for by utilizing Equation 11:

$$a_u = (M-D+1)|h|^2 e^{j2\pi f\Delta T_s D} + \gamma_u \quad (13).$$

Due to the coherent combining term (i.e. the first right-hand term in Equation 13) associated with a correct timing hypotheses, the magnitude of $a_m$ can be utilized as a quantitative reliability metric. In other words, PSS processing circuit 310 may utilize the magnitude of each resulting autocorrelation value $a_m$ as a reliability metric to evaluate the correctness of each associated timing estimate $t_m$. PSS processing circuit 310 may therefore select the timing estimate $t_m$ associated with the demodulated candidate PSS vector $d_m$ that produces the highest reliability metric (i.e., the highest magnitude $|a_m|$) as timing synchronization parameter t'. PSS processing circuit 310 may subsequently provide the selected $t_m$ to RF transceiver 304 as timing synchronization parameter t' for use in timing synchronization.

PSS processing circuit 310 may additionally determine frequency synchronization parameter $f_\Delta'$ based on the selection of timing estimate $t_m$ as timing synchronization parameter t'. PSS processing circuit 310 may assume timing estimate $t_m$ as the correct value for PSS vectoral temporal location in received signal $r_t$, and calculate the phase of $a_u$ according to Equation 13 in order to obtain the corresponding frequency offset. PSS processing circuit 310 may then provide the phase of $a_u$ as frequency synchronization parameter $f_\Delta'$ to RF transceiver 304.

Figure 7:
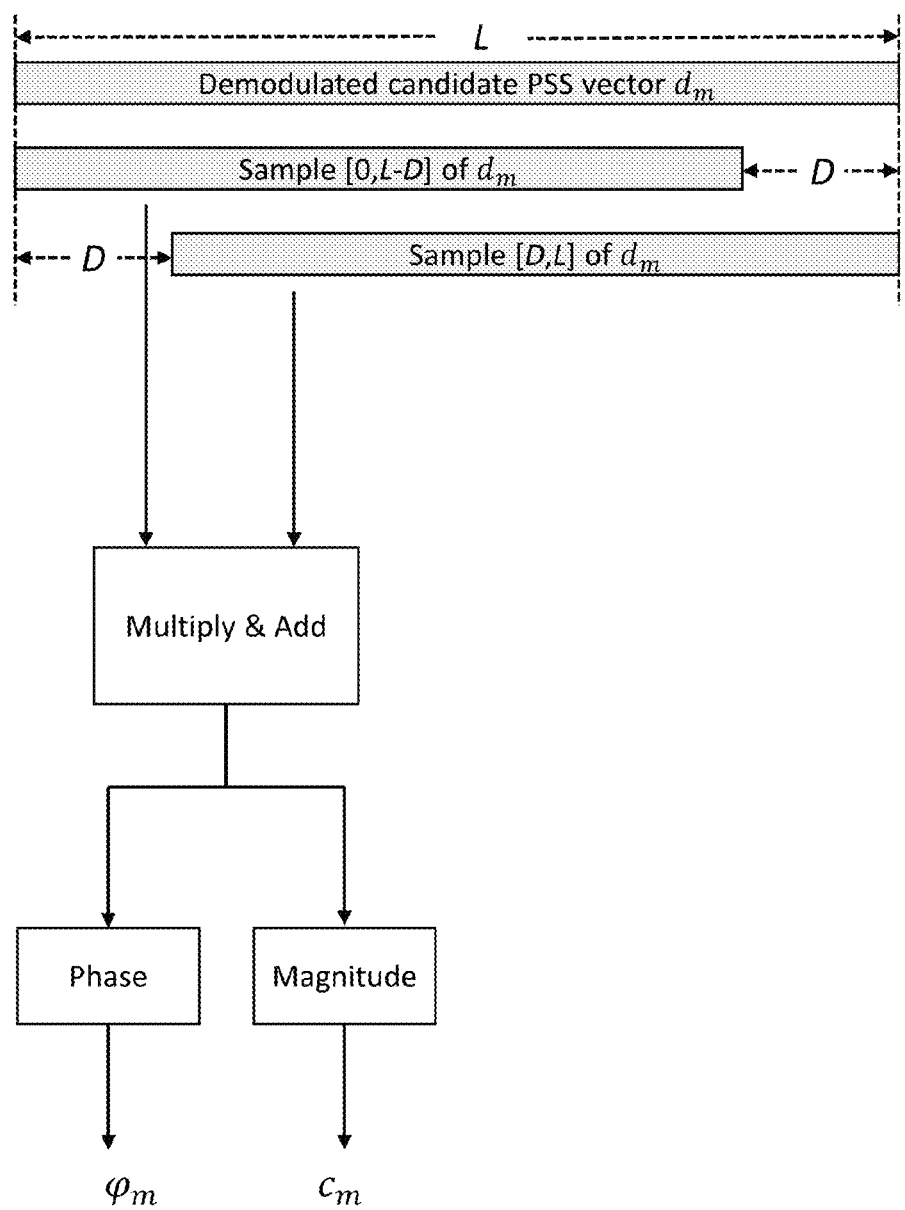
FIG. 7 illustrates the calculation of a reliability metric and a carrier frequency offset for a timing estimate.

FIG. 7 illustrates a block diagram illustrating the exemplary process performed by PSS processing circuit 310 in order to determine synchronization parameters $f_\Delta'$ and t'. PSS processing circuit 310 may produce M demodulated candidate PSS vectors $d_m$, m={0, 1, ..., M−1}, each having a length of L samples, where each demodulated candidate PSS vector $d_m$ corresponds to a timing estimate $t_m$.

PSS processing circuit 310 may then select autocorrelation parameter D, and calculate the autocorrelation $a_m$ between $d_m[0:L-D]$ (i.e. the $0^{th}$ to $(L-D)^{th}$ samples of vector $d_m$) and $d_m[D:L]$ according to Equation 12. PSS processing circuit 310 may then compute the magnitude $|a_m|$ of the resulting autocorrelation value $a_m$ in order to obtain the corresponding reliability metric $c_m$ (where $c_m=|a_m|$). PSS processing circuit 310 may additionally calculate the phase $f_{\Delta,m}$ of $a_m$ (i.e. where $f_{\Delta,m}=\angle a_m$) assuming a correct timing hypothesis $t_m$ according to Equation 13. PSS processing circuit 310 may subsequently perform a comparison using the M resulting reliability metrics $c_m$ to identify the highest-valued reliability metric. PSS processing circuit 310 may then select the timing estimate $t_m$ associated with the highest reliability metric $c_m$ as timing synchronization parameter t', and provide the corresponding time synchronization parameter t' to RF transceiver 304. PSS processing circuit 310 may additionally provide the respective phase value $f_{A,m}$ to RF transceiver 304 as frequency synchronization parameter $f_A'$, i.e. as the calculated carrier frequency offset. Alternatively, PSS processing circuit 310 may first evaluate each of the resulting reliability metrics $c_m$ to select time synchronization parameter t', and subsequently calculate frequency synchronization parameter $f_A'$ directly based on the selected timing synchronization parameter t'.

As shown in FIG. 3, PSS processing circuit 310 may provide time synchronization parameter t' and frequency synchronization parameter $f_A'$ to RF transceiver 304. RF transceiver 304 may then utilize timing synchronization parameter t' and frequency synchronization parameter $f_A'$ to synchronize the future reception of received radio signals from a transmitting cell, such as e.g. a cell located at one of base stations 104-108. RF transceiver 304 may additionally use timing synchronization parameter t' and frequency synchronization parameter $f_A'$ to synchronize uplink transmissions from UE 102 to one of base stations 104-108. Timing synchronization parameter t' may be utilize to schedule the correct reception points in time, while frequency synchronization parameter $f_A'$ may be used to perform compensation for carrier frequency offset. UE 102 may thus have accurate values for both t' and $f_A'$, and reception performance may consequently improve. Additionally, UE 102 may be able to complete effective time and frequency synchronization in an efficient time frame without executing a full PBCH decoding process. Latency in obtaining time and frequency synchronization may be reduced, thereby improving overall user experience.

PSS processing circuit 312 may additionally be configured to check the obtained values of t' and $f_A'$ to ensure suitability as synchronization parameters. For example, PSS processing circuit 312 may check $f_A'$ to ensure that $f_A'$ falls within a frequency offset range associated with timing synchronization parameter t'. This may be e.g. performed using the known relationship between cross-correlation peaks and frequency offset in PSS vectors as detailed regarding FIG. 4. If the frequency offset $f_A'$ does not fall within a frequency offset range associated with timing synchronization parameter t', PSS processing circuit 312 may then select the timing estimate $t_m$ associated with the next highest reliability metric $c_m$ as timing synchronization parameter t'.

Alternatively to selecting the timing estimate $t_m$ associated with the highest-valued reliability metric $c_m$ as t', PSS processing circuit 312 may utilize a plurality of timing estimates $t_m$ to derive an accurate value for t'. For example, PSS processing circuit 312 may select e.g. the two highest valued reliability metrics $c_{m1}$ and $c_{m2}$, and calculate t' according to a combination of the respectively associated timing estimates $t_{m1}$ and $t_{m2}$. PSS processing circuit 312 could perform this e.g. using a weighted calculation or by utilizing the known PSS cross-correlation peak offset to frequency offset curves as detailed regarding FIG. 4.

Figure 8:
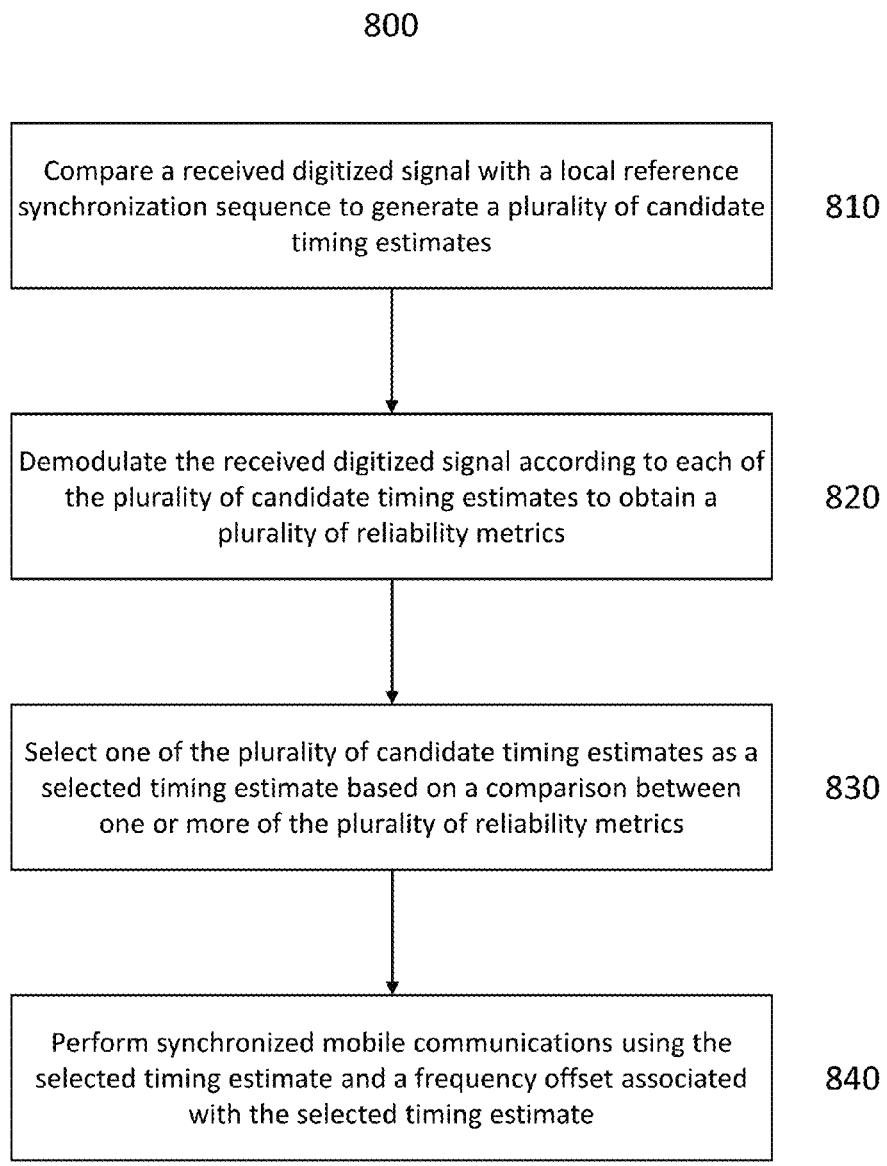
FIG. 8 illustrates a method for performing mobile communications according to an exemplary aspect of the disclosure.

FIG. 8 illustrates a method 800 for performing mobile communications according to an exemplary aspect of the disclosure. In 810, method 800 may compare a received digitized signal with a local reference synchronization sequence to generate a plurality of candidate timing estimates. Each of the plurality of candidate timing estimates may represent an estimated temporal location of a synchronization sequence in the received digitized signal.

In 820, method 800 may demodulate the received digitized signal according to each of the plurality of candidate timing estimates to obtain a plurality of reliability metrics, where each of the plurality of reliability metrics may be associated with one of the plurality of candidate timing estimates. Method 800 may then select one of the plurality of candidate timing estimates as a selected timing estimate based on a comparison between one or more of the plurality of reliability metrics in 830. In 840, method 800 may perform synchronized mobile communications using the selected timing estimate and a frequency offset associated with the selected timing estimate.

Method 800 may further include wherein the comparing a received digitized signal with a local reference synchronization sequence includes identifying a peak correlation value in time between the received digitized signal and the reference synchronization sequence to generate a peak timing estimate. The plurality of candidate timing estimates may be generated based on the peak timing estimate and a carrier frequency offset range associated with the received digitized signal.

Method 800 may further include determining the carrier frequency offset range based on an accuracy level of a local oscillator used to receive the received digitized signal. The plurality of candidate timing estimates may be generated to compensate for errors in the peak timing estimate caused by a carrier frequency offset associated with the received digitized signal. The carrier frequency offset associated with the received digitized signal may be caused by a carrier frequency mismatch between a carrier frequency of the received digitized signal and a carrier frequency used to receive the received digitized signal.

Method 800 may further include wherein the plurality of candidate timing estimates are generated based on a predetermined relationship between the local reference synchronization sequence and carrier frequency offsets.

The demodulating the received digitized signal according to each of the plurality of candidate timing estimates to produce a plurality of reliability metrics may further include generating a plurality of demodulated synchronization sequences from the received digitized signal, and evaluating each of the plurality of demodulated synchronization sequences to produce the plurality of reliability metrics. Evaluating each of the plurality of demodulated synchronization sequences to produce the plurality of reliability metrics may include calculating an autocorrelation of each of the plurality of demodulated synchronization sequences to produce a plurality of autocorrelation metrics. Each of the plurality of reliability metrics may be based on one of the plurality of autocorrelation metrics. Each of the plurality of reliability metrics may be the absolute value of one of the plurality of autocorrelation metrics.

Method 800 may further include wherein the selecting one of plurality of candidate timing estimates as a selected timing estimate includes selecting a candidate timing estimate associated with a maximum-valued reliability metric of the plurality of reliability metrics from the plurality of candidate timing estimates as the selected timing estimate. The selecting a candidate timing estimate associated with a maximum-valued reliability metric may include selecting the candidate timing estimate associated with the highest valued reliability metric from the plurality of candidate timing estimates as the selected timing estimate.

Method 800 may further include calculating the frequency offset value associated with the selected timing estimate based on the selected timing estimate.

Method 800 may further include wherein the performing synchronized mobile communications includes synchronizing reception and transmission of wireless signals using the selected timing estimate and the frequency offset value.

Method 800 may further include wherein the selecting one of the plurality of candidate timing estimates as a selected timing estimate includes selecting a first timing estimate from the plurality of candidate timing estimates, calculating a first frequency offset value based on the first timing estimate, and selecting the first timing estimate as the selected timing estimate if the first frequency offset value is contained within a frequency offset range associated with the first timing estimate.

The received digitized signal contains a Primary Synchronization Sequence (PSS), and where the local reference synchronization sequence is based on the PSS contained in the received digitized signal.

The mobile communications are performed in accordance with a Long Term Evolution (LTE) network.

UE 102 may be configured in a manner so as to implement a method similar to method 800. For example, UE 102 may include a timing estimate generation processor (e.g. timing estimate generation circuit 308) configured to generate a plurality of timing estimates, where each of the plurality of candidate timing estimates represents an estimated temporal location of a synchronization sequence in a received digitized signal. UE 102 may further include a demodulation/selection processor (e.g. PSS processing circuit 310) configured to demodulate the received digitized signal according to each of the plurality of candidate timing estimates to obtain a plurality of reliability metrics, where each of the plurality of reliability metrics is associated with one of the plurality of candidate timing estimates, and select one of the plurality of candidate timing estimates as a selected timing estimate based on a comparison between one or more of the plurality of reliability metrics. UE 102 may also include a transceiver (e.g. RF transceiver 304) configured to perform synchronized mobile communications using the selected timing estimate and a frequency offset associated with the selected timing estimate.

UE 102 may further include a peak timing processor configured to calculate a peak correlation value in time between a local reference synchronization sequence and the received digitized signal. The timing estimate generation processor may be further configured to generate the plurality of timing estimates based on the calculated peak correlation value in time and a carrier frequency offset range associated with the received digitized signal. The carrier frequency offset range may be determined based on an accuracy level of a local oscillator used to receive the received digitized signal.

The timing estimate generation processor of UE 102 may be further configured to generate the plurality of candidate timing estimates to compensate for errors in the calculated peak correlation value in time caused by a carrier frequency offset associated with the received digitized signal. The carrier frequency offset associated with the received digitized signal may be caused by a carrier frequency mismatch between a carrier frequency of the received digitized signal and a carrier frequency used to receive the received digitized signal.

The timing estimate generation processor of UE 102 may be further configured to generate the plurality of candidate timing estimates based on a predetermined relationship between the local reference synchronization sequence and carrier frequency offsets.

The demodulation/selection processor of UE 102 may be further configured to demodulate the received digitized signal according to each of the plurality of candidate timing estimates to obtain the plurality of reliability metrics by generating a plurality of demodulated synchronization sequences from the received digitized signal, and evaluating each of the plurality of demodulated synchronization sequences to produce a plurality of reliability metrics.

The demodulation/selection processor of UE 102 may be configured to evaluate each of the plurality of demodulated synchronization sequences to produce the plurality of reliability metrics by calculating an autocorrelation of each of the plurality of demodulated synchronization sequences to produce a plurality of autocorrelation metrics, wherein each of the plurality of reliability metrics may be based on one of the plurality of autocorrelation metrics. Each of the plurality of reliability metrics may be the absolute value of one of the plurality of autocorrelation metrics.

The demodulation/selection processor of UE 102 may be configured to select one of the plurality of candidate timing estimates as the selected timing estimate by selecting a candidate timing estimate associated with a maximum-valued reliability metric of the plurality of reliability metrics from the plurality of candidate timing estimates as the selected timing estimate. The demodulation/selection processor may be configured to select the candidate timing estimate associated with a maximum-valued reliability metric by selecting the candidate timing estimate associated with the highest valued reliability metric from the plurality of candidate timing estimates as the selected timing estimate.

The demodulation/selection processor of UE 102 may be further configured to calculate the frequency offset value associated with the selected timing estimate based on the selected timing estimate.

The transceiver of UE 102 may be further configured to perform synchronized mobile communications by synchronizing reception and transmission of wireless signals using the selected timing estimate and the frequency offset value.

The demodulation/selection processor of UE 102 may be further configured to select one of the plurality of candidate timing estimates as the selecting timing estimate by selecting a first timing estimate from the plurality of candidate timing estimates, calculating a first frequency offset value based on the first timing estimate, and selecting the first timing estimate as the selected timing estimate if the first frequency offset value is contained within a frequency offset range associated with the first timing estimate.

The received digitized signal may a Primary Synchronization Sequence (PSS), and where the local reference synchronization sequence may be based on the PSS contained in the received digitized signal.

UE 102 may be configured to operate on a Long Term Evolution (LTE) network.

FIG. 9 illustrates a method 900 for performing mobile communications according to another exemplary aspect of the disclosure.

In 910, method 900 may compare a received digitized signal with a local reference synchronization sequence to generate a peak timing estimate. The peak timing estimate may represent an estimated temporal location of a synchronization sequence in the received digitized signal. Method 900 may generate a plurality of candidate timing estimates based on the peak timing estimate and an estimated carrier frequency offset range in 920. Method 900 may then demodulate the received digitized signal according to each of the plurality of candidate timing estimates to obtain a plurality of demodulated synchronization sequences, where each of the plurality of demodulated synchronization sequences may be associated with one of the plurality of candidate timing estimates.

In 940, method 900 may select one of the plurality of candidate timing estimates as a selected timing estimate based on an analysis of one or more of the plurality of demodulated synchronization sequences, and may then calculate a carrier frequency offset based on the selected timing estimate in 950. In 960, method 900 may perform synchronized mobile communications using the selected timing estimate and the carrier frequency offset.

Method 900 may further include wherein the comparing a received digitized signal with a local reference synchronization sequence includes identifying a peak correlation value in time between the received digitized signal and the reference synchronization sequence to generate a peak timing estimate. The carrier frequency offset range may be determined based on an accuracy level of a local oscillator used to receive the received digitized signal. The plurality of candidate timing estimates may be generated to compensate for errors in the peak timing estimate caused by a carrier frequency offset associated with the received digitized signal.

The carrier frequency offset associated with the received digitized signal may be caused by a carrier frequency mismatch between a carrier frequency of the received digitized signal and a carrier frequency used to receive the received digitized signal.

Method 900 may further include wherein the generating a plurality of candidate timing estimates based on the peak timing estimate and an estimated carrier frequency offset range includes generating the plurality of candidate timing estimates based on a predetermined relationship between the local reference synchronization sequence and carrier frequency offsets.

Method 900 may further include wherein the selecting one of the plurality of candidate timing estimates as a selected timing estimate includes evaluating each of the plurality of demodulated synchronization sequences to produce a plurality of reliability metrics, and selecting one of the plurality of candidate timing estimates as the selected timing estimate based on a comparison between one or more of the plurality of reliability metrics.

Method 900 may further include wherein the evaluating each of the plurality of demodulated synchronization sequences to produce a plurality of reliability metrics includes calculating an autocorrelation of each of the plurality of demodulated synchronization sequences to produce a plurality of autocorrelation metrics. Each of the plurality of reliability metrics may be based on one of the plurality of autocorrelation metrics. Each of the plurality of reliability metrics may be the absolute value of one of the plurality of autocorrelation metrics.

Method 900 may further include wherein the selecting one of plurality of candidate timing estimates as a selected timing estimate includes selecting a candidate timing estimate associated with a maximum-valued reliability metric of the plurality of reliability metrics from the plurality of candidate timing estimates as the selected timing estimate.

Selecting a candidate timing estimate associated with a maximum-valued reliability metric may include selecting the candidate timing estimate associated with the highest valued reliability metric of the plurality of reliability metrics from the plurality of candidate timing estimates as the selected timing estimate.

Method 900 may further include wherein the performing synchronized mobile communications includes synchronizing reception and transmission of wireless signals using the selected timing estimate and the carrier frequency offset value.

Method 900 may further include wherein the selecting one of the plurality of candidate timing estimates as a selected timing estimate includes selecting a first timing estimate from the plurality of candidate timing estimates, calculating a first frequency offset value based on the first timing estimate, and selecting the first timing estimate as the selected timing estimate if the first frequency offset value is contained within a frequency offset range associated with the first timing estimate.

Method 900 may further include wherein the received digitized signal contains a Primary Synchronization Sequence (PSS), and where the local reference synchronization sequence is based on the PSS contained in the received digitized signal.

Method 900 may further include wherein the mobile communications are performed in accordance with a Long Term Evolution (LTE) network.

UE 102 may be configured in a manner so as to implement a method similar to method 800. For example, UE 102 may include a peak timing processor (e.g. peak timing estimation circuit 306) to compare a received digitized signal with a local reference synchronization sequence to generate a peak timing estimate. The peak timing estimate may represent an estimated temporal location of a synchronization sequence in the received digitized signal.

UE 102 may also include a timing estimate generation processor (e.g. timing estimate generation circuit 308), which may be configured to generate a plurality of candidate timing estimates based on the peak timing estimate and an estimated carrier frequency offset range.

UE 102 may further include a demodulation/selection processor (e.g. PSS processing circuit 310), which may be configured to demodulate the received digitized signal according to each of the plurality of candidate timing estimates to obtain a plurality of demodulated synchronization sequences. Each of the plurality of demodulated synchronization sequences may be associated with one of the plurality of candidate timing estimates. The demodulation/selection processor may be further configured to select one of the plurality of candidate timing estimates as a selected timing estimate based on an analysis of one or more of the plurality of demodulated synchronization sequences and calculate a carrier frequency offset based on the selected timing estimate.

UE 102 may also include a transceiver (e.g. RF transceiver 304) configured to perform synchronized mobile communications using the selected timing estimate and the carrier frequency offset.

The peak timing processor may be configured to generate the peak timing estimate by identifying a peak correlation value in time between the received digitized signal and the reference synchronization sequence to generate a peak timing estimate.

The timing estimate generation processor may be further configured to determine the carrier frequency offset range based on an accuracy level of a local oscillator used to receive the received digitized signal. The timing estimate generation processor may be configured to generate the plurality of candidate timing estimates to compensate for errors in the calculated peak correlation value in time caused by a carrier frequency offset associated with the received digitized signal. The carrier frequency offset associated with the received digitized signal may be caused by a carrier frequency mismatch between a carrier frequency of the received digitized signal and a carrier frequency used to receive the received digitized signal.

The timing estimate generation processor may be configured to generate the plurality of candidate timing estimates based on a predetermined relationship between the local reference synchronization sequence and carrier frequency offsets.

The demodulation/selection processor may be configured to select one of the plurality of candidate timing estimates based as the selected timing estimate by evaluating each of the plurality of demodulated synchronization sequences to produce a plurality of reliability metrics, and selecting one of the plurality of candidate timing estimates as the selected timing estimate based on a comparison between one or more of the plurality of reliability metrics. The demodulation/selection processor may be configured to evaluate each of the plurality of demodulated synchronization sequences to produce the plurality of reliability metrics by calculating an autocorrelation of each of the plurality of demodulated synchronization sequences to produce a plurality of autocorrelation metrics. Each of the plurality of reliability metrics may be based on one of the plurality of autocorrelation metrics. Each of the plurality of reliability metrics may be the absolute value of one of the plurality of autocorrelation metrics.

The demodulation/selection processor may be configured to select one of the plurality of candidate timing estimates as the selected timing estimate by selecting a candidate timing estimate from the plurality of candidate timing estimates associated with a maximum-valued reliability metric of the plurality of reliability metrics as the selected timing estimate.

The demodulation/selection circuit may be configured to select the candidate timing estimate from the plurality of candidate timing estimates associated with a maximum-valued reliability metric of the plurality of reliability metrics as the selected timing estimate by selecting the candidate timing estimate associated with the highest valued reliability metric of the plurality of reliability metrics from the plurality of candidate timing estimates as the selected timing estimate.

The transceiver may be configured to perform synchronized mobile communications by synchronizing reception and transmission of wireless signals using the selected timing estimate and the carrier frequency offset value.

The demodulation/selection processor may be configured to select one of the plurality of candidate timing estimates as the selected timing estimate by selecting a first timing estimate from the plurality of candidate timing estimates, calculating a first frequency offset value based on the first timing estimate, and selecting the first timing estimate as the selected timing estimate if the first frequency offset value is contained within a frequency offset range associated with the first timing estimate.

The received digitized signal may contain a Primary Synchronization Sequence (PSS), and the local reference synchronization sequence may be based on the PSS contained in the received digitized signal.

UE 102 may be configured to operate on a Long Term Evolution (LTE) network.

The following examples pertain to further aspects of this disclosure:

Example 1 is a method for performing mobile communications comprising. The method includes comparing a received digitized signal with a local reference synchronization sequence to generate a plurality of candidate timing estimates, where each of the plurality of candidate timing estimates represents an estimated temporal location of a synchronization sequence in the received digitized signal, demodulating the received digitized signal according to each of the plurality of candidate timing estimates to produce a plurality of reliability metrics, where each of the plurality of reliability metrics is associated with one of the plurality of candidate timing estimates, selecting one of the plurality of candidate timing estimates as a selected timing estimate based on a comparison between one or more of the plurality of reliability metrics, and performing synchronized mobile communications using the selected timing estimate and a frequency offset value associated with the selected timing estimate.

In Example 2, the subject matter of Example 1 can optionally include wherein the comparing a received digitized signal with a local reference synchronization sequence includes identifying a peak correlation value in time between the received digitized signal and the reference synchronization sequence to generate a peak timing estimate.

In Example 3, the subject matter of Example 1 can optionally include wherein the plurality of candidate timing estimates are generated based on the peak timing estimate and a carrier frequency offset range associated with the received digitized signal.

In Example 4, the subject matter of Example 3 can optionally include determining the carrier frequency offset range based on an accuracy level of a local oscillator used to receive the received digitized signal.

In Example 5, the subject matter of Example 1 or 2 can optionally include wherein the plurality of candidate timing estimates are generated to compensate for errors in the peak timing estimate caused by a carrier frequency offset associated with the received digitized signal.

In Example 6, then subject matter of Example 5 can optionally include wherein the carrier frequency offset associated with the received digitized signal is caused by a carrier frequency mismatch between a carrier frequency of the received digitized signal and a carrier frequency used to receive the received digitized signal.

In Example 7, the subject matter of Example 6 can optionally include wherein the plurality of candidate timing estimates are generated based on a predetermined relationship between the local reference synchronization sequence and carrier frequency offsets.

In Example 8, the subject matter of Examples 1 to 7 can optionally include wherein the demodulating the received digitized signal according to each of the plurality of candidate timing estimates to produce a plurality of reliability metrics includes generating a plurality of demodulated synchronization sequences from the received digitized signal, and evaluating each of the plurality of demodulated synchronization sequences to produce the plurality of reliability metrics.

In Example 9, the subject matter of Example 8 can optionally include wherein the evaluating each of the plurality of demodulated synchronization sequences to produce the plurality of reliability metrics includes calculating an autocorrelation of each of the plurality of demodulated synchronization sequences to produce a plurality of autocorrelation metrics, wherein each of the plurality of reliability metrics is based on one of the plurality of autocorrelation metrics.

In Example 10, the subject matter of Example 9 can optionally include wherein each of the plurality of reliability metrics is the absolute value of one of the plurality of autocorrelation metrics.

In Example 11, the subject matter of Examples 1 to 10 can optionally include wherein the selecting one of plurality of candidate timing estimates as a selected timing estimate includes selecting a candidate timing estimate associated with a maximum-valued reliability metric of the plurality of reliability metrics from the plurality of candidate timing estimates as the selected timing estimate.

In Example 12, the subject matter of Example 11 can optionally include wherein the selecting a candidate timing estimate associated with a maximum-valued reliability metric includes selecting the candidate timing estimate associated with the highest valued reliability metric from the plurality of candidate timing estimates as the selected timing estimate.

In Example 13, the subject matter of Examples 1 to 12 can optionally include calculating the frequency offset value associated with the selected timing estimate based on the selected timing estimate.

In Example 14, the subject matter of Examples 1 to 13 can optionally include wherein the performing synchronized mobile communications includes synchronizing reception and transmission of wireless signals using the selected timing estimate and the frequency offset value.

In Example 15, the subject matter of Examples 1 to 14 can optionally include wherein the selecting one of the plurality of candidate timing estimates as a selected timing estimate includes selecting a first timing estimate from the plurality of candidate timing estimates, calculating a first frequency offset value based on the first timing estimate, and selecting the first timing estimate as the selected timing estimate if the first frequency offset value is contained within a frequency offset range associated with the first timing estimate.

In Example 16, the subject matter of Examples 1 to 15 can optionally include wherein the received digitized signal contains a Primary Synchronization Sequence (PSS), and where the local reference synchronization sequence is based on the PSS contained in the received digitized signal.

In Example 17, the subject matter of Examples 1 to 16 can optionally include wherein the mobile communications are performed in accordance with a Long Term Evolution (LTE) network.

Example 18 is a mobile terminal device. The mobile terminal device includes a timing estimate generation processor configured to generate a plurality of timing estimates, where each of the plurality of candidate timing estimates represents an estimated temporal location of a synchronization sequence in a received digitized signal, a demodulation/selection processor configured to demodulate the received digitized signal according to each of the plurality of candidate timing estimates to obtain a plurality of reliability metrics, where each of the plurality of reliability metrics is associated with one of the plurality of candidate timing estimates, and select one of the plurality of candidate timing estimates as a selected timing estimate based on a comparison between one or more of the plurality of reliability metrics, and a transceiver configured to perform synchronized mobile communications using the selected timing estimate and a frequency offset associated with the selected timing estimate.

In Example 19, the subject matter of Example 18 can optionally include a peak timing processor configured to calculate a peak correlation value in time between a local reference synchronization sequence and the received digitized signal.

In Example 20, the subject matter of Example 19 can optionally include wherein the timing estimate generation processor is further configured to generate the plurality of timing estimates based on the calculated peak correlation value in time and a carrier frequency offset range associated with the received digitized signal.

In Example 21, the subject matter of Example 20 can optionally include wherein the carrier frequency offset range is determined based on an accuracy level of a local oscillator used to receive the received digitized signal.

In Example 22, the subject matter of Example 19 can optionally include wherein the timing estimate generation processor is configured to generate the plurality of candidate timing estimates to compensate for errors in the calculated peak correlation value in time caused by a carrier frequency offset associated with the received digitized signal.

In Example 23, the subject matter of Example 22 can optionally include wherein the carrier frequency offset associated with the received digitized signal is caused by a carrier frequency mismatch between a carrier frequency of the received digitized signal and a carrier frequency used to receive the received digitized signal.

In Example 24, the subject matter of Example 23 can optionally include wherein the timing estimate generation processor is configured to generate the plurality of candidate timing estimates based on a predetermined relationship between the local reference synchronization sequence and carrier frequency offsets.

In Example 25, the subject matter of Examples 18 to 24 can optionally include wherein the demodulation/selection processor is configured to demodulate the received digitized signal according to each of the plurality of candidate timing estimates to obtain the plurality of reliability metrics by generating a plurality of demodulated synchronization sequences from the received digitized signal, and evaluating each of the plurality of demodulated synchronization sequences to produce a plurality of reliability metrics.

In Example 26, the subject matter of Example 25 can optionally include wherein the demodulation/selection processor is configured to evaluate each of the plurality of demodulated synchronization sequences to produce the plurality of reliability metrics by calculating an autocorrelation of each of the plurality of demodulated synchronization sequences to produce a plurality of autocorrelation metrics, wherein each of the plurality of reliability metrics is based on one of the plurality of autocorrelation metrics.

In Example 27, the subject matter of Example 26 can optionally include wherein each of the plurality of reliability metrics is the absolute value of one of the plurality of autocorrelation metrics.

In Example 28, the subject matter of Examples 18 to 26 can optionally include wherein the demodulation/selection processor is configured to select one of the plurality of candidate timing estimates as the selected timing estimate by selecting a candidate timing estimate associated with a maximum-valued reliability metric of the plurality of reliability metrics from the plurality of candidate timing estimates as the selected timing estimate.

In Example 29, the subject matter of Example 28 can optionally include wherein the demodulation/selection processor is configured to select the candidate timing estimate associated with a maximum-valued reliability metric by selecting the candidate timing estimate associated with the highest valued reliability metric from the plurality of candidate timing estimates as the selected timing estimate.

In Example 30, the subject matter of Examples 18 to 29 can optionally include wherein the demodulation/selection processor is further configured to calculate the frequency offset value associated with the selected timing estimate based on the selected timing estimate.

In Example 31, the subject matter of Examples 18 to 30 can optionally include wherein the transceiver is configured to perform synchronized mobile communications by synchronizing reception and transmission of wireless signals using the selected timing estimate and the frequency offset value.

In Example 32, the subject matter of Examples 18 to 31 can optionally include wherein the demodulation/selection processor is further configured to select one of the plurality of candidate timing estimates as the selecting timing estimate by selecting a first timing estimate from the plurality of candidate timing estimates, calculating a first frequency offset value based on the first timing estimate, and selecting the first timing estimate as the selected timing estimate if the first frequency offset value is contained within a frequency offset range associated with the first timing estimate.

In Example 33, the subject matter of Examples 18 to 32 can optionally include wherein the received digitized signal contains a Primary Synchronization Sequence (PSS), and where the local reference synchronization sequence is based on the PSS contained in the received digitized signal.

In Example 34, the subject matter of Examples 18 to 33 can optionally include wherein the mobile terminal device is configured to operate on a Long Term Evolution (LTE) network.

Example 35 is a method for performing mobile communications comprising. The method includes comparing a received digitized signal with a local reference synchronization sequence to generate a peak timing estimate, where the peak timing estimate represents an estimated temporal location of a synchronization sequence in the received digitized signal, generating a plurality of candidate timing estimates based on the peak timing estimate and an estimated carrier frequency offset range, demodulating the received digitized signal according to each of the plurality of candidate timing estimates to generate a plurality of demodulated synchronization sequences, where each of the plurality of demodulated synchronization sequences is associated with one of the plurality of candidate timing estimates, selecting one of the plurality of candidate timing estimates as a selected timing estimate based on an analysis of one or more of the plurality of demodulated synchronization sequences, calculating a carrier frequency offset value based on the selected timing estimate, and performing synchronized mobile communications using the selected timing estimate and the carrier frequency offset value.

In Example 36, the subject matter of Example 35 can optionally include wherein the comparing a received digitized signal with a local reference synchronization sequence includes identifying a peak correlation value in time between the received digitized signal and the reference synchronization sequence to generate a peak timing estimate.

In Example 37, the subject matter of Examples 34 or 35 can optionally include determining the carrier frequency offset range based on an accuracy level of a local oscillator used to receive the received digitized signal.

In Example 38, the subject matter of Example 35 or 36 can optionally include wherein the plurality of candidate timing estimates are generated to compensate for errors in the peak timing estimate caused by a carrier frequency offset associated with the received digitized signal.

In Example 39, the subject matter of Example 38 can optionally include wherein the carrier frequency offset associated with the received digitized signal is caused by a carrier frequency mismatch between a carrier frequency of the received digitized signal and a carrier frequency used to receive the received digitized signal.

In Example 40, the subject matter of Example 39 can optionally include wherein the generating a plurality of candidate timing estimates based on the peak timing estimate and an estimated carrier frequency offset range includes generating the plurality of candidate timing estimates based on a predetermined relationship between the local reference synchronization sequence and carrier frequency offsets.

In Example 41, the subject matter of Examples 35 to 40 can optionally include wherein the selecting one of the plurality of candidate timing estimates as a selected timing estimate includes evaluating each of the plurality of demodulated synchronization sequences to produce a plurality of reliability metrics, and selecting one of the plurality of candidate timing estimates as the selected timing estimate based on a comparison between one or more of the plurality of reliability metrics.

In Example 42, the subject matter of Example claim 41 can optionally include wherein the evaluating each of the plurality of demodulated synchronization sequences to produce a plurality of reliability metrics includes calculating an autocorrelation of each of the plurality of demodulated synchronization sequences to produce a plurality of autocorrelation metrics, wherein each of the plurality of reliability metrics is based on one of the plurality of autocorrelation metrics.

In Example 43, the subject matter of Example claim 42 can optionally include wherein each of the plurality of reliability metrics is the absolute value of one of the plurality of autocorrelation metrics.

In Example 44, the subject matter of Examples 41 to 43 can optionally include wherein the selecting one of plurality of candidate timing estimates as a selected timing estimate includes selecting a candidate timing estimate associated with a maximum-valued reliability metric of the plurality of reliability metrics from the plurality of candidate timing estimates as the selected timing estimate.

In Example 45, the subject matter of Example 44 can optionally include wherein the selecting a candidate timing estimate associated with a maximum-valued reliability metric includes selecting the candidate timing estimate associated with the highest valued reliability metric of the plurality of reliability metrics from the plurality of candidate timing estimates as the selected timing estimate.

In Example 46, the subject matter of Examples 35 to 45 can optionally include wherein the performing synchronized mobile communications includes synchronizing reception and transmission of wireless signals using the selected timing estimate and the carrier frequency offset value.

In Example 47, the subject matter of Examples 35 to 46 can optionally include wherein the selecting one of the plurality of candidate timing estimates as a selected timing estimate includes selecting a first timing estimate from the plurality of candidate timing estimates, calculating a first frequency offset value based on the first timing estimate, and selecting the first timing estimate as the selected timing estimate if the first frequency offset value is contained within a frequency offset range associated with the first timing estimate.

In Example 48, the subject matter of Examples 35 to 47 can optionally include wherein the received digitized signal contains a Primary Synchronization Sequence (PSS), and where the local reference synchronization sequence is based on the PSS contained in the received digitized signal.

In Example 49, the subject matter of Examples 35 to 48 can optionally include wherein the mobile communications are performed in accordance with a Long Term Evolution (LTE) network.

Example 50 is a mobile terminal device. The mobile terminal device includes a peak timing processor configured to compare a received digitized signal with a local reference synchronization sequence to generate a peak timing estimate, where the peak timing estimate represents an estimated temporal location of a synchronization sequence in the received digitized signal, a timing estimate generation processor configured to generate a plurality of candidate timing estimates based on the peak timing estimate and an estimated carrier frequency offset range, a demodulation/selection processor configured to demodulate the received digitized signal according to each of the plurality of candidate timing estimates to obtain a plurality of demodulated synchronization sequences, where each of the plurality of demodulated synchronization sequences is associated with one of the plurality of candidate timing estimates, select one of the plurality of candidate timing estimates as a selected timing estimate based on an analysis of one or more of the plurality of demodulated synchronization sequences, and calculate a carrier frequency offset based on the selected timing estimate, and a transceiver configured to perform synchronized mobile communications using the selected timing estimate and the carrier frequency offset.

In Example 51, the subject matter of Example 50 can optionally include wherein the peak timing processor is configured to generate the peak timing estimate by identifying a peak correlation value in time between the received digitized signal and the reference synchronization sequence to generate a peak timing estimate.

In Example 52, the subject matter of Example 50 or 51 can optionally include wherein the timing estimate generation processor is further configured to determine the carrier frequency offset range based on an accuracy level of a local oscillator used to receive the received digitized signal.

In Example 53, the subject matter of Example 50 or 51 can optionally include wherein the timing estimate generation processor is configured to generate the plurality of candidate timing estimates to compensate for errors in the calculated peak correlation value in time caused by a carrier frequency offset associated with the received digitized signal.

In Example 54, the subject matter of Example 53 can optionally include wherein the carrier frequency offset associated with the received digitized signal is caused by a carrier frequency mismatch between a carrier frequency of the received digitized signal and a carrier frequency used to receive the received digitized signal.

In Example 55, the subject matter of Example 54 can optionally include wherein the timing estimate generation processor is configured to generate the plurality of candidate timing estimates based on a predetermined relationship between the local reference synchronization sequence and carrier frequency offsets.

In Example 56, the subject matter of Examples 50 to 55 can optionally include wherein the demodulation/selection processor is configured to select one of the plurality of candidate timing estimates based as the selected timing estimate by evaluating each of the plurality of demodulated synchronization sequences to produce a plurality of reliability metrics, and selecting one of the plurality of candidate timing estimates as the selected timing estimate based on a comparison between one or more of the plurality of reliability metrics.

In Example 57, the subject matter of Example 56 can optionally include wherein the demodulation/selection processor is configured to evaluate each of the plurality of demodulated synchronization sequences to produce the plurality of reliability metrics by calculating an autocorrelation of each of the plurality of demodulated synchronization sequences to produce a plurality of autocorrelation metrics, wherein each of the plurality of reliability metrics is based on one of the plurality of autocorrelation metrics.

In Example 58, the subject matter of Example 57 can optionally include wherein each of the plurality of reliability metrics is the absolute value of one of the plurality of autocorrelation metrics.

In Example 59, the subject matter of Examples 56 to 59 can optionally include wherein the demodulation/selection processor is configured to select one of the plurality of candidate timing estimates as the selected timing estimate by selecting a candidate timing estimate from the plurality of candidate timing estimates associated with a maximum-valued reliability metric of the plurality of reliability metrics as the selected timing estimate.

In Example 60, the subject matter of Example 59 can optionally include wherein the demodulation/selection circuit is configured to select the candidate timing estimate from the plurality of candidate timing estimates associated with a maximum-valued reliability metric of the plurality of reliability metrics as the selected timing estimate by selecting the candidate timing estimate associated with the highest valued reliability metric of the plurality of reliability metrics from the plurality of candidate timing estimates as the selected timing estimate.

In Example 61, the subject matter of Examples 50 to 60 can optionally include wherein the transceiver is configured to perform synchronized mobile communications by synchronizing reception and transmission of wireless signals using the selected timing estimate and the carrier frequency offset value.

In Example 62, the subject matter of Examples 50 to 61 can optionally include wherein the demodulation/selection processor is configured to select one of the plurality of candidate timing estimates as the selected timing estimate by selecting a first timing estimate from the plurality of candidate timing estimates, calculating a first frequency offset value based on the first timing estimate, and selecting the first timing estimate as the selected timing estimate if the first frequency offset value is contained within a frequency offset range associated with the first timing estimate.

In Example 63, the subject matter of Examples 50 to 62 can optionally include wherein the received digitized signal contains a Primary Synchronization Sequence (PSS), and where the local reference synchronization sequence is based on the PSS contained in the received digitized signal.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A mobile terminal device comprising:
a timing estimate generation processor configured to generate a plurality of candidate timing estimates, wherein each of the plurality of candidate timing estimates represents an estimated temporal location of a synchronization sequence in a received digitized signal;
a demodulation/selection processor configured to demodulate the received digitized signal according to each of the plurality of candidate timing estimates to obtain a plurality of reliability metrics, wherein each of the plurality of reliability metrics is associated with one of the plurality of candidate timing estimates, and select one of the plurality of candidate timing estimates as a selected timing estimate based on a comparison between one or more of the plurality of reliability metrics; and
a transceiver configured to perform synchronized mobile communications using the selected timing estimate and a frequency offset associated with the selected timing estimate.

2. The mobile terminal device of claim 1, further comprising:
a peak timing processor configured to calculate a peak correlation value in time between a local reference synchronization sequence and the received digitized signal.

3. The mobile terminal device of claim 2, wherein the timing estimate generation processor is further configured to generate the plurality of candidate timing estimates based on the calculated peak correlation value in time and a carrier frequency offset range associated with the received digitized signal.

4. The mobile terminal device of claim 3, wherein the carrier frequency offset range is determined based on an accuracy level of a local oscillator used to receive the received digitized signal.

5. The mobile terminal device of claim 1, wherein the timing estimate generation processor is configured to generate the plurality of candidate timing estimates based on a predetermined relationship between the local reference synchronization sequence and a carrier frequency offset.

6. The mobile terminal device of claim 1, wherein the demodulation/selection processor is configured to demodulate the received digitized signal according to each of the plurality of candidate timing estimates to obtain the plurality of reliability metrics by:
   generating a plurality of demodulated synchronization sequences from the received digitized signal; and
   evaluating each of the plurality of demodulated synchronization sequences to produce a plurality of reliability metrics.

7. The mobile terminal device of claim 6, wherein the demodulation/selection processor is configured to evaluate each of the plurality of demodulated synchronization sequences to produce the plurality of reliability metrics by:
   calculating an autocorrelation of each of the plurality of demodulated synchronization sequences to produce a plurality of autocorrelation metrics, wherein each of the plurality of reliability metrics is based on one of the plurality of autocorrelation metrics.

8. The mobile terminal device of claim 1, wherein the demodulation/selection processor is configured to select one of the plurality of candidate timing estimates as the selected timing estimate by:
   selecting a candidate timing estimate associated with a maximum-valued reliability metric of the plurality of reliability metrics from the plurality of candidate timing estimates as the selected timing estimate.

9. The mobile terminal device of claim 1, wherein the demodulation/selection processor is further configured to:
   calculate the frequency offset value associated with the selected timing estimate based on the selected timing estimate.

10. A method for performing mobile communications comprising:
    comparing a received digitized signal with a local reference synchronization sequence to generate a plurality of candidate timing estimates, wherein each of the plurality of candidate timing estimates represents an estimated temporal location of a synchronization sequence in the received digitized signal;
    demodulating the received digitized signal according to each of the plurality of candidate timing estimates to produce a plurality of reliability metrics, wherein each of the plurality of reliability metrics is associated with one of the plurality of candidate timing estimates;
    selecting one of the plurality of candidate timing estimates as a selected timing estimate based on a comparison between one or more of the plurality of reliability metrics; and
    performing synchronized mobile communications using the selected timing estimate and a frequency offset value associated with the selected timing estimate.

11. The method of claim 10, wherein the comparing a received digitized signal with a local reference synchronization sequence comprises identifying a peak correlation value in time between the received digitized signal and the reference synchronization sequence to generate a peak timing estimate.

12. The method of claim 10, wherein the plurality of candidate timing estimates are generated based on the peak timing estimate and a carrier frequency offset range associated with the received digitized signal.

13. The method of claim 12, further comprising:
    determining the carrier frequency offset range based on an accuracy level of a local oscillator used to receive the received digitized signal.

14. The method of claim 10, wherein the plurality of candidate timing estimates are generated based on a predetermined relationship between the local reference synchronization sequence and a carrier frequency offset.

15. The method of claim 10, further comprising:
    calculating the frequency offset value associated with the selected timing estimate based on the selected timing estimate.

16. A mobile terminal device comprising:
    a peak timing processor configured to compare a received digitized signal with a local reference synchronization sequence to generate a peak timing estimate, wherein the peak timing estimate represents an estimated temporal location of a synchronization sequence in the received digitized signal;
    a timing estimate generation processor configured to generate a plurality of candidate timing estimates based on the peak timing estimate and an estimated carrier frequency offset range;
    a demodulation/selection processor configured to demodulate the received digitized signal according to each of the plurality of candidate timing estimates to obtain a plurality of demodulated synchronization sequences, wherein each of the plurality of demodulated synchronization sequences is associated with one of the plurality of candidate timing estimates, the demodulation/selection processor further configured to select one of the plurality of candidate timing estimates as a selected timing estimate based on an analysis of one or more of the plurality of demodulated synchronization sequences and calculate an estimated carrier frequency offset based on the selected timing estimate; and
    a transceiver configured to perform synchronized mobile communications using the selected timing estimate and the estimated carrier frequency offset.

17. The mobile terminal device of claim 16, wherein the peak timing processor is configured to generate the peak timing estimate by:
    identifying a peak correlation value in time between the received digitized signal and the reference synchronization sequence to generate a peak timing estimate.

18. The mobile terminal device of claim 16, wherein the estimated carrier frequency offset comprises an approximation of a carrier frequency mismatch between a carrier frequency of the received digitized signal and a carrier frequency used to receive the received digitized signal.

19. The mobile terminal device of claim 16, wherein the demodulation/selection processor is configured to select one of the plurality of candidate timing estimates based as the selected timing estimate by:
    evaluating each of the plurality of demodulated synchronization sequences to produce a plurality of reliability metrics; and selecting one of the plurality of candidate timing estimates as the selected timing estimate based on a comparison between one or more of the plurality of reliability metrics.

20. The mobile terminal device of claim 19, wherein each of the plurality of reliability metrics is an absolute value of one of a plurality of autocorrelation metrics.

* * * * *